(12) United States Patent
Nishimura et al.

(10) Patent No.: US 6,308,002 B1
(45) Date of Patent: Oct. 23, 2001

(54) IMAGE RECEIVER, IMAGE RECEPTION METHOD, IMAGE TRANSMITTER, IMAGE TRANSMISSION METHOD, IMAGE TRANSMITTER/RECEIVER, AND IMAGE TRANSMISSION/RECEPTION METHOD

(75) Inventors: Hajime Nishimura; Munehiro Yoshikawa, both of Kanagawa; Hiroyuki Ishimaru, Saitama, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/952,894

(22) PCT Filed: Mar. 28, 1997

(86) PCT No.: PCT/JP97/01073

§ 371 Date: Nov. 25, 1997

§ 102(e) Date: Nov. 25, 1997

(87) PCT Pub. No.: WO97/37496

PCT Pub. Date: Oct. 9, 1997

(30) Foreign Application Priority Data

Mar. 29, 1996 (JP) .................................................... 8-075716
Jul. 9, 1996 (JP) .................................................... 8-178959

(51) Int. Cl.⁷ ............................... H04N 5/76; H04N 5/917
(52) U.S. Cl. ............................................. 386/46; 386/109
(58) Field of Search .............................. 386/46, 109, 111, 386/112, 27, 33, 124, 40, 1, 95, 68; 360/32; H04N 5/76, 5/917

(56) References Cited

U.S. PATENT DOCUMENTS 5,758,012 * 5/1998 Keesen ................................. 386/109
6,038,371 * 3/2000 Shimoda et al. ..................... 386/111

* cited by examiner

*Primary Examiner*—Robert Chevalier
(74) *Attorney, Agent, or Firm*—Frommer Lawrence & Haug, LLP; William S. Frommer; Glenn F. Savit

(57) ABSTRACT

Picture data received in the order of DC components and AC components is stored in a frame memory 115. At this point, an ID number detecting portion 117 detects an ID of a sync block and sends the detected ID to an encoding portion 114. Corresponding to the ID, the encoding portion 114 determines whether or not data that is read from a frame memory 93 is a buffering unit that has been stored. Thus, when the read data is the buffering unit, the read data is output as it is. When the read data is not the buffering unit, gray data is output.

14 Claims, 14 Drawing Sheets

Fig. 8

Track No.

| | | | | |
|---|---|---|---|---|
| 0 | 0 | 0 | 0 | Track—0 |
| 0 | 0 | 0 | 1 | Track—1 |
| 0 | 0 | 1 | 0 | Track—2 |
| 0 | 0 | 1 | 1 | Track—3 |
| 0 | 1 | 0 | 0 | Track—4 |
| 0 | 1 | 0 | 1 | Track—5 |
| 0 | 1 | 1 | 0 | Track—6 |
| 0 | 1 | 1 | 1 | Track—7 |
| 1 | 0 | 0 | 0 | Track—8 |
| 1 | 0 | 0 | 1 | Track—9 |

Fig. 9

| | | | | | | | | |
|---|---|---|---|---|---|---|---|---|
| 0 | 0 | 0 | 0 | 0 | 0 | 0 | 0 | Sync No.0 |
| 0 | 0 | 0 | 0 | 0 | 0 | 0 | 1 | Sync No.1 |
| 0 | 0 | 0 | 0 | 0 | 0 | 1 | 0 | Sync No.2 |
| | | | | ⋮ | | | | |
| 1 | 0 | 0 | 0 | 0 | 1 | 1 | 0 | Sync No.134 |

Fig. 13A

| 0 | 0 |
|---|---|
| 0 | 0 |
| 0 | 0 |
| 0 | 0 |
| 0 | 0 |
| 0 | 1 |
| 0 | 1 |
| 0 | 0 |

| 0 | 0 |
|---|---|
| 0 | 0 |
| 0 | 0 |
| 0 | 0 |
| 0 | 0 |
| 0 | 1 |
| 0 | 1 |
| 0 | 0 |

CR, CB

IMAGE RECEIVER, IMAGE RECEPTION METHOD, IMAGE TRANSMITTER, IMAGE TRANSMISSION METHOD, IMAGE TRANSMITTER/RECEIVER, AND IMAGE TRANSMISSION/RECEPTION METHOD

TECHNICAL FIELD

The present invention relates to a picture receiving apparatus, a picture receiving method, a picture sending apparatus, a picture sending method, a picture sending/receiving apparatus, and a picture sending/receiving method, in particular to a picture receiving apparatus for receiving a still picture sent through a transmission medium, a picture receiving method thereof, a picture sending apparatus thereof, a picture sending method thereof, a picture sending/receiving apparatus thereof, and a picture sending/receiving method thereof.

BACKGROUND ART

When a still picture is sent through a transmission medium such as an ISDN (Integrated Service Digital Network) line, the sender side performs a picture compressing process for the still picture and the receiver side performs a picture decompressing process for the received signal so as to restore the original still picture.

However, when picture data that is sent through a transmission medium whose transmission rate is not sufficiently high such as an ISDN line is received by a receiving apparatus and supplied to a video signal recording apparatus such as a DVCR (Digital Video Cassette Recorder), the receiving apparatus cannot sufficiently supply the picture signal to the DVCR. In the worst case, a decoding error may take place in the DVCR.

In addition, it takes around 13.5 seconds to send one frame of still picture through the ISDN line. Thus, when picture data is retrieved from for example a database connected to the ISDN line, it takes a long time to determine whether or not the received picture is a desired picture.

DISCLOSURE OF THE INVENTION

The present invention is made from the above-described point of view. An object of the present invention is to allow the user to see the content of an original picture decoded from picture information received through a transmission medium as quick as possible and free from a decoding error.

The present invention is a picture receiving apparatus for receiving a picture signal that is sent in the order of DC components and AC components through a transmission medium, performing a predetermined process for the picture signal, and outputting the resultant picture signal to a peripheral unit, comprising a receiving means for receiving the picture signal, a storing means for storing the picture signal received by said receiving means, a reading means for successively reading the picture signal stored in said storing means, an adding means for adding EOB information representing the end position of data to each macro block contained in a sync block composing the DC components read by said reading means, and an outputting means for outputting the DC components received from said adding means and the AC components received from said reading means.

The present invention is a picture receiving method for receiving a picture signal that is sent in the order of DC components and AC components through a transmission medium, performing a predetermined process for the picture signal, and outputting the resultant picture signal to a peripheral unit, comprising the steps of receiving the picture signal, storing the picture signal received at the receiving step, successively reading the picture signal stored at the storing step, adding EOB information representing the end position of data to each macro block contained in a sync block composing the DC components read at the reading step, and outputting the DC components received at the adding step and the AC components received at the reading step.

The present invention is a picture receiving apparatus for receiving DC components of a picture signal sent through a transmission medium, performing a predetermined process for the DC components, and outputting the resultant data to a peripheral unit, comprising a receiving means for receiving the DC components, a storing means for storing the DC components received by said receiving means, a reading means for successively reading the DC components stored in said storing means, an adding means for adding EOB information representing the end position of data to each macro block contained in a sync block composing the DC components read by said reading means, and an outputting means for outputting the DC components received from said adding means.

The present invention is a picture receiving method for receiving DC components of a picture signal sent through a transmission medium, performing a predetermined process for the DC components, and outputting the resultant data to a peripheral unit, comprising the steps of receiving the DC components, storing the DC components received at the receiving step, successively reading the DC components stored at the storing step, adding EOB information representing the end position of data to each macro block contained in a sync block composing the DC components read at the reading step, and outputting the DC components received at the adding step.

The present invention is a picture sending/receiving apparatus having a sender unit and a receiver unit, the sender unit sending a picture signal through a transmission medium, the receiver unit reproducing the received picture signal, wherein the sender unit comprises a separating and extracting means for separating and extracting DC components and AC components from the picture signal, a first sending means for sending the DC components extracted by said separating and extracting means through the transmission medium, and a second sending means for sending the AC components extracted by said separating and extracting means through the transmission medium, and wherein the receiver unit comprises a receiving means for receiving the DC components and the AC components, a storing means for storing the DC components and the AC components received by said receiving means, a reading means for successively reading the DC components and the AC components stored in said storing means, an adding means for adding EOB information representing the end position of data to each macro block contained in a sync block composing the DC components read by said reading means, and an outputting means for outputting the DC components received from said adding means and the AC components received from said reading means.

The present invention is a picture sending/receiving method of a sender unit and a receiver unit, the sender unit sending a picture signal through a transmission medium, the receiver unit reproducing the received picture signal, comprising the steps of (a) causing the sender unit to separate and extract DC components and AC components from the picture signal, (b) causing the sender unit to send the DC components extracted at step (a) through the transmission medium, (c) causing the sender unit send the AC components extracted at step (a) through the transmission medium, (d) causing the receiver unit to receive the DC components and the AC components, (e) causing the receiver unit to store the DC components and the AC components received at step (d), (f) causing the receiver unit to successively read the DC components and the AC components stored at step (e), (g) causing the receiver unit to add EOB information representing the end position of data to each macro block contained in a sync block composing the DC components read at step (f), and (h) causing the receiver unit to output the DC components received at step (g) and the AC components received at step (f).

According to the present invention, a picture signal is received and stored. EOB information that represents the end position of data is added to each macro block contained in a sync block composing DC components. The obtained DC components and the stored AC components are output. Thus, since the DC components that contain a rough contour are displayed earlier than the AC components, the content of the received picture can be quickly recognized.

According to the present invention, DC components are received and stored. The stored DC components are successively read. EOB information that represents the end position of data is added to each macro block contained in a sync block composing the DC components. Thus, the DC components can be displayed as a semi-moving picture on a display unit.

According to the present invention, DC components are extracted from a picture signal. The extracted DC components are sent through a transmission medium. Thus, information of a rough contour can be sent.

According to the present invention, the sender side separately extracts DC components and AC components from a picture signal and sends the DC components and the AC components in the order. The receiver side receives and stores the received DC components and AC components. The stored DC components and AC components are successively read. When the information that has been read is the DC components, EOB information that represents the end position of data is added to each macro block contained in a sync block. When the information that has been read is AC components, the information is output as it is. Thus, desired picture information can be quickly retrieved from much picture information stored on the sender side.

BRIEF DESCRIPTION OF DRAWINGS

FIG. 8 is a schematic diagram for explaining an arrangement of track numbers;

FIG. 9 is a schematic diagram for explaining an arrangement of sync numbers;

FIGS. 13A and 13B are schematic diagrams showing the structure of gray codes;

BEST MODES FOR CARRYING OUT THE INVENTION

Figure 1:
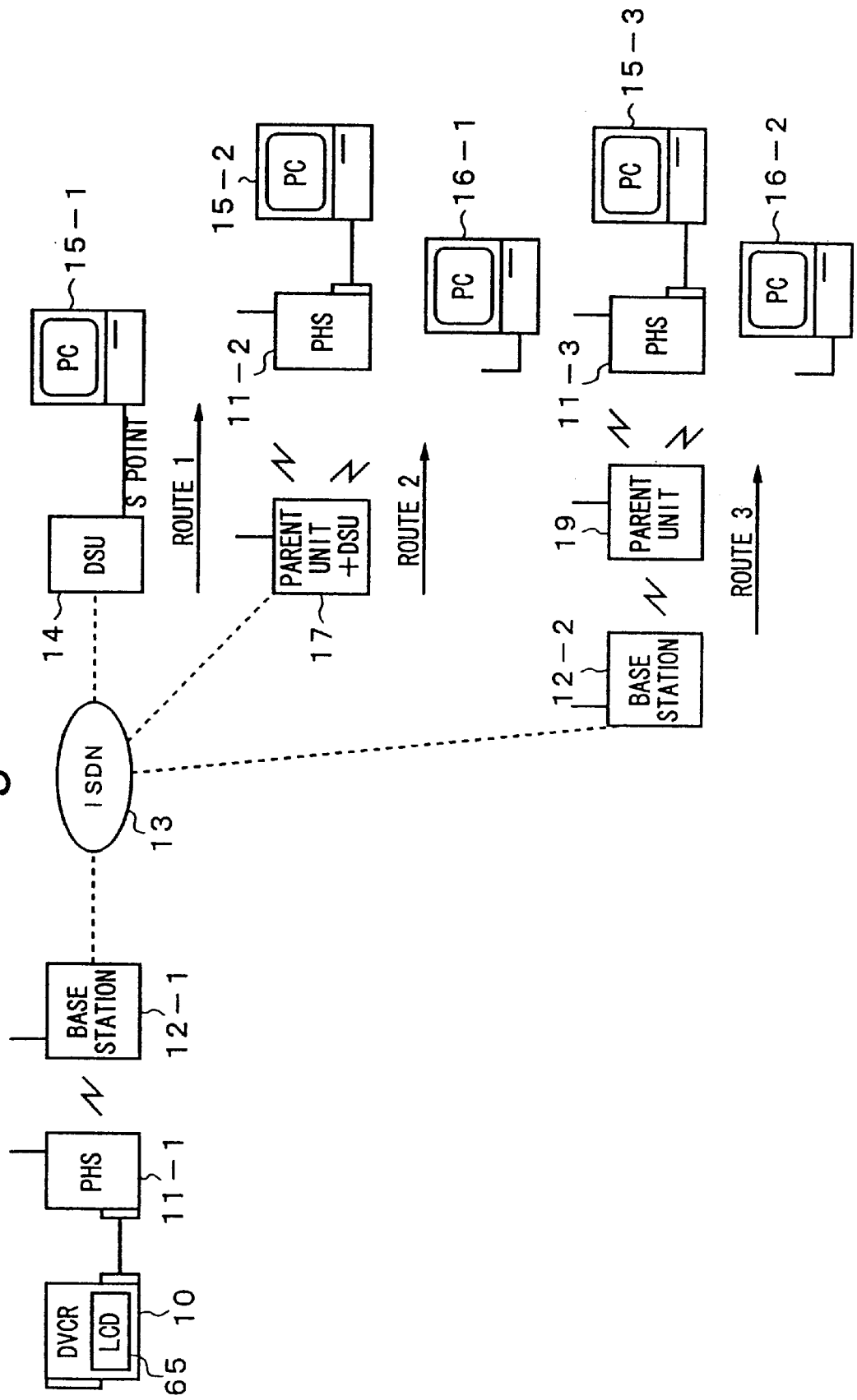
FIG. 1 is a schematic diagram showing an example of the structure of a picture sending/receiving system according to the present invention.

FIG. 1 is a schematic diagram showing an example of the structure of a picture sending/receiving system according to an embodiment of the present invention. In this embodiment, a DVCR 10 digitizes a picture signal received from a CCD (not shown), performs a picture compressing process such as an orthogonal converting process, records the resultant signal as video data on a magnetic tape, and displays the video data on an LCD (Liquid Crystal Display) 65. In addition, the DVCR 10 outputs video data to a PHS (Personal Handyphone System) 11-1 through IEEE (The Institute of Electrical and Electronic Engineers) 1394 standard.

The IEEE 1394 standard is a general standard that supports an isochronous data transmission. Since the isochronous data transmission ensures that data transmission is completed in a predetermined time period, a moving picture and sound can be smoothly reproduced.

Base stations 12-1, 12-2, and so forth are disposed in individual service areas. The base stations 12-1 and 12-2 exchange data as a radio wave with the PHS 11-1 and a parent unit 19. An ISDN line 13 sends data among the base stations 12-1 and 12-2, a DSU (Digital Service Unit) 14, and a parent unit 17.

The DSU 14 connects the ISDN line 13 and a personal computer 15-1. In addition, when the DSU 14 exchanges data between the ISDN line 13 and the personal computer 15-1, the DSU 14 converts the format of the data. The personal computers 15-1 to 15-3 perform predetermined processes for received video data, display the resultant data on their display units, and record the data on their hard disks or the like (not shown).

The parent unit 17 has a DSU. The DSU modulates a carrier corresponding to data received through the ISDN line 13 and sends the modulated carrier as a radio wave to a PHS 11-2. In addition, the parent unit 17 converts a radio wave received from the PHS 11-2 into an electric signal and sends the resultant signal to the ISDN line 13. A personal computer 16-1 sends and receives data as a radio wave to/from the parent unit 17. In addition, the personal computer 16-1 performs a predetermined process for received data, displays the resultant data on its display unit, and records the data on a hard disk or the like (not shown).

The base station 12-2 modulates a carrier corresponding to data received through the ISDN line 13 and sends the carrier as a radio wave to a parent unit 19. In addition, the base station 12-2 receives a radio wave from the parent unit 19, converts the radio wave into an electric signal, and sends the electric signal to the ISDN line 13. The parent unit 19 amplifies the radio wave received from the base station 12-2 and sends the resultant radio wave to a PHS 11-3 or a personal computer 16-2. In addition, the parent unit 19 receives a radio wave from the PHS 11-3 or the personal computer 16-2, amplifies the received radio wave, and sends the resultant radio wave to the base station 12-2. In this structure, since the parent unit 19 functions as a relaying unit, a radio wave with a sufficient intensity can be sent and received regardless of geographic conditions and so forth.

Next, the operation of the embodiment will be described.

Video data that is output from the DVCR 10 is input to the PHS 11-1. The PHS 11-1 performs a predetermined process (that will be described later) for the input video data, modulates a carrier of 1.9 GHz corresponding to the received signal and sends the modulated carrier as a radio wave to the base station 12-1. The base station 12-1 receives the radio wave from the PHS 11-1, converts the received radio wave into an electric signal, and sends the electric signal to the ISDN line 13.

On route 1, a signal (data) is sent to the DSU 14 through the ISDN line 13. The DSU 14 separates a multiplexed signal of a send signal and a receive signal received through the ISDN line 13 into two send signals and two receive signals at S/T point (or referred to as I interface) and supplies these separated signals to the personal computer 15-1. In addition, the DSU 14 performs a process for converting transmission rates of signals from 64 kbps to 32 kbps. The DSU 14 sends the resultant signals to the personal computer 15-1. The personal computer 15-1 performs a predetermined process for the converted signals and displays the resultant signals as a picture on the display unit. In addition, the personal computer 15-1 can send data.

On route 2, the parent unit 17 performs the above-described converting process (performed by the DSU 14 on the route 1) for data received through the ISDN line 13, converts the resultant signals into a radio wave corresponding to a PHS format, and sends the radio wave. The PHS 11-2 receives the radio wave from the parent unit 17, performs the predetermined process for the radio wave, and sends the resultant signal to the personal computer 15-2 through the IEEE 1394 interface. The personal computer 15-2 reads a signal from the IEEE 1394 interface through an ISA (Industry Standard Architecture) bus or a PCI (Peripheral Component Interconnect) bus, performs the predetermined process for the resultant signal, displays the resultant signal as a picture on the display unit, and records the signal on a hard disk or the like (not shown). In addition, the personal computer 15-2 can send picture data on the reverse route.

Since the personal computer 16-1 has a function for receiving a radio wave corresponding to the PHS format, the personal computer 16-1 receives a radio wave from the parent unit 17, performs the predetermined process for the received radio wave, displays the resultant signal as a picture on the display unit, and records the signal on a hard disk or the like (not shown).

On route 3, the base station 12-2 converts data received through the ISDN line 13 into a radio wave corresponding to the PHS format and sends the radio wave to the parent unit 19. The parent unit 19 receives the radio wave from the base station 12-2, amplifies the radio wave, and sends the amplified radio wave to the PHS 11-3. The PHS 11-3 receives the radio wave from the parent unit 19, performs the predetermined process for the radio wave, and sends the resultant signal to the personal computer 15-3. As with the routes 1 and 2, the personal computer 15-3 performs the predetermined process for the input signal, displays the resultant signal on the display unit, and records the signal on a hard disk or the like (not shown).

As with the personal computer 16-1, the personal computer 16-2 has a function for receiving a radio wave corresponding to the PHS format. Thus, the personal computer 16-2 receives a radio wave from the parent unit 19, performs the predetermined process for the radio wave, displays the resultant signal as a picture on the display unit, and records the signal on a hard disk or the like (not shown).

In each of the personal computers 15-1 to 15-3, a DVCR decoding IC or software performs a decompressing process for the received video data (that has been picture-compressed corresponding to DVCR system). The resultant picture is displayed on the display unit and recorded on a hard disk or the like (not shown). In addition, a picture and so forth recorded on the hard disk or the like can be compressed by a DVCR encoding IC or software and then output.

As described above, each of the personal computers 16-1 and 16-2 sends and receives a radio wave corresponding to the PHS format. Moreover, in each of the personal computers 16-1 and 16-2, the DVCR decoding IC and DVCR encoding IC or software performs the picture compressing/decompressing process.

Figure 2:
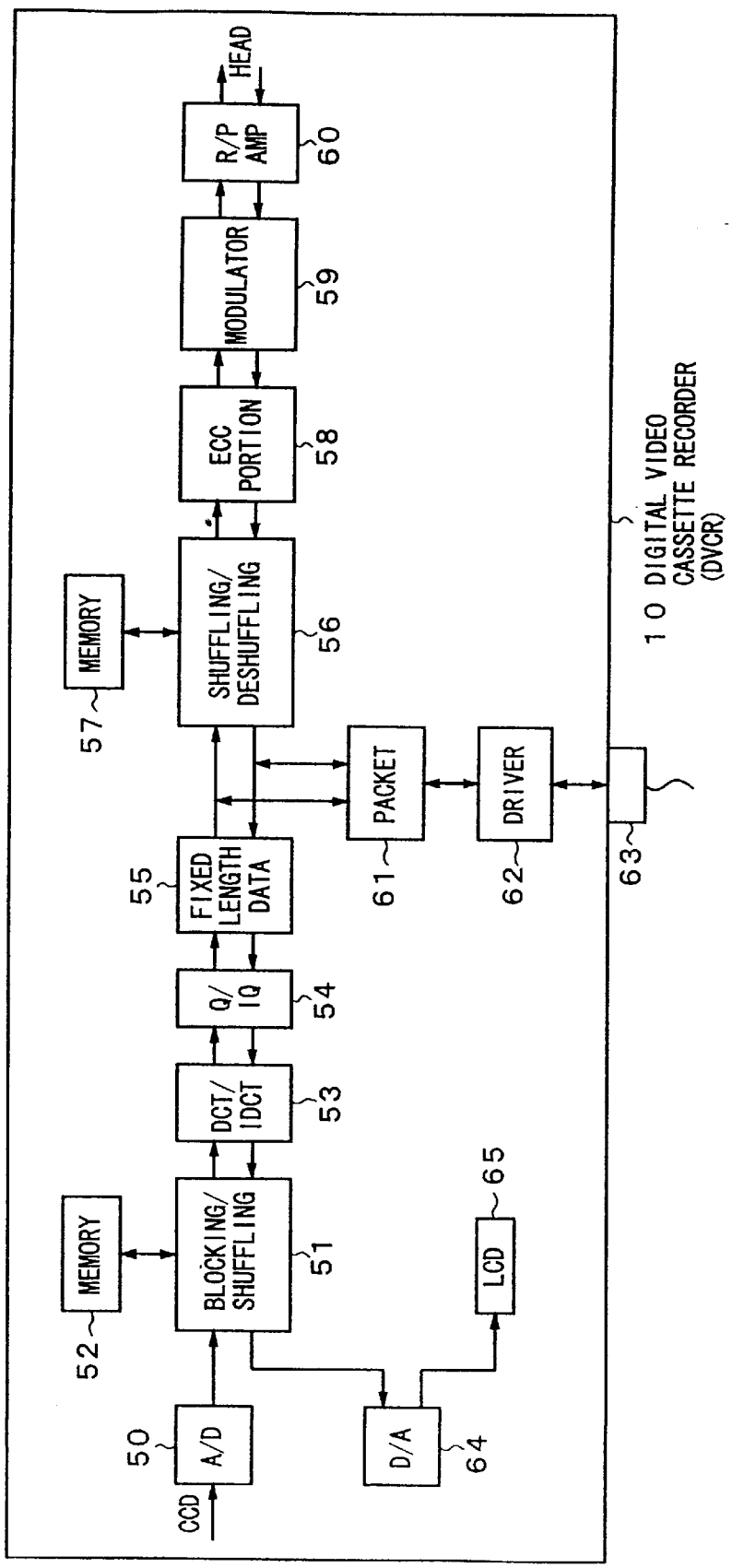
FIG. 2 is a block diagram showing an example of the structure of a DVCR 10 shown in FIG. 1.

FIG. 2 is a block diagram showing an example of the structure of the DVCR 1 shown in FIG. 1. The DVCR 10 comprises an A/D converter 50, a block segmenting/shuffling portion 51, a memory 52, a DCT/IDCT calculating portion 53, a quantizing/dequantizing portion 54, a fixed length data forming portion 55, a shuffling/deshuffling portion 56, a memory 57, an ECC portion 58, a modulating portion 59, a recording/reproducing (playback) amplifier portion (R/P AMP) 60, a packet forming portion 61, a driver 62, a connector 63, a D/A converter 64, and an LCD 65.

The A/D converter 50 converts a video signal (composed of luminance signal, red color difference signal, and blue color difference signal) that is output from a CCD (not shown) into digital data. In this case, the ratio of the sampling frequency of the luminance signal of the A/D converter 50 and the sampling frequency of the red color difference signal or the blue color difference signal is 4 to 1. The A/D converter 50 supplies a digitized video signal (hereinafter referred to as video data) to the block segmenting/shuffling portion 51. The block segmenting/shuffling portion 51 performs a block segmenting process and a shuffling process for the video data.

In other words, in the block segmenting process of the block segmenting/shuffling portion 51, video data (composed of luminance data Y, red color difference data CR, and blue color data CB) of each frame supplied from the A/D converter 50 is divided into blocks each of which is composed of 8×8 pixels. These blocks are referred to as DCT (Discrete Cosin Transform) blocks.

Figure 3:
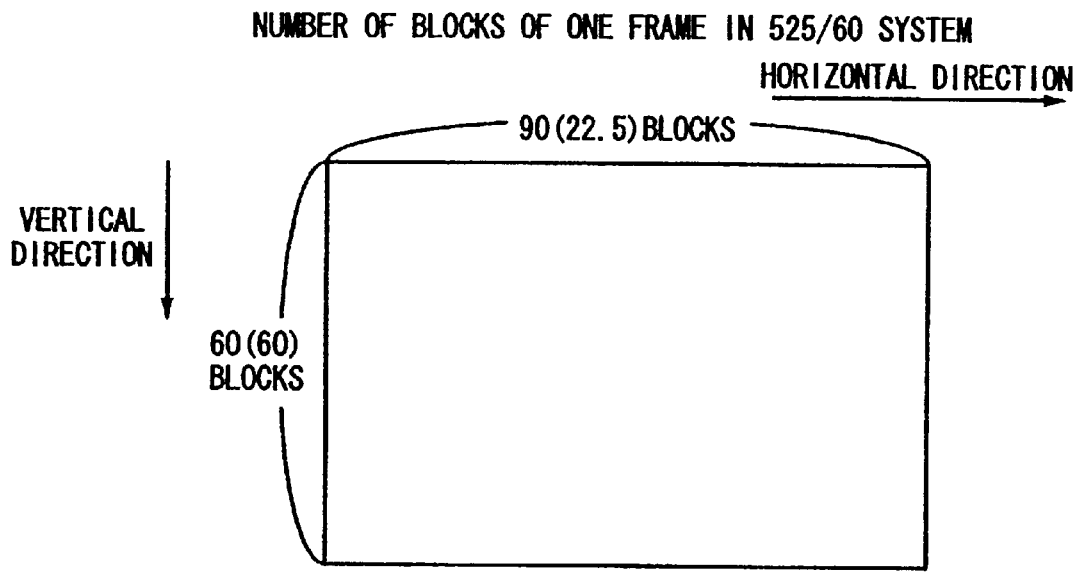
FIG. 3 is a schematic diagram showing the structure of one frame of a 525/60 system.

In this case, since the sampling frequency of the luminance signal of the A/D converter 50 is different from the sampling frequency of the color difference signal thereof, four blocks of the luminance data Y, one block of the color difference data CR, and one block of the color difference data CB are present at the same position (area) on the screen. For example, in the case of 525/60 system, as shown in FIG. 3, in the horizontal direction of one frame (left and right directions of FIG. 3), 90 blocks of luminance data Y, 22.5 blocks of color difference data CR, and 22.5 blocks of color difference data CB are placed. In the vertical direction (upper and lower directions of FIG. 3), 60 blocks of luminance data Y, 60 blocks of color difference data CR, and 60 blocks of color difference data CB are placed.

Figure 4A:
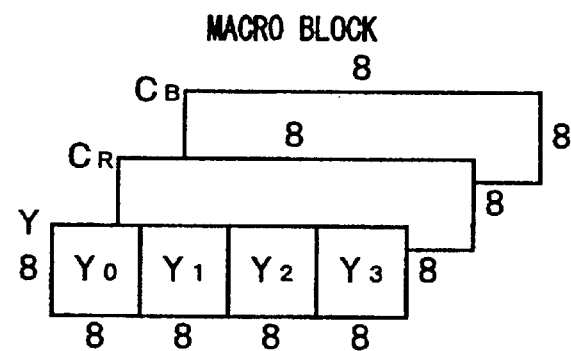
FIGS. 4A and 4B are schematic diagrams showing the structures of macro blocks.
Figure 4B:
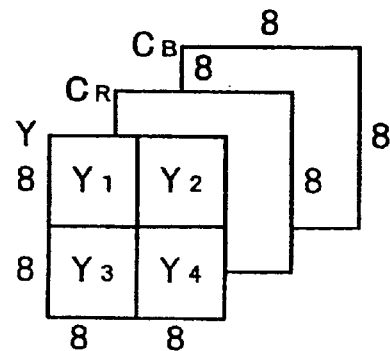

A total of six blocks (four blocks of luminance data Y (Y0 to Y3), one block of color difference data CR, and one block of color difference data CB) are treated as one process unit. These 6 blocks are referred to as a macro block (MB). FIGS. 4A and 4B show the structures of macro blocks of the 525/60 system. FIG. 4B shows the structure of a macro block at an edge portion of the screen of which the number of blocks of each of the color difference data CR and CB is 0.5 blocks. FIG. 4A shows the structure of a macro block at other portions of the screen.

In the shuffling process performed by the block segmenting/shuffling portion 51, five macro blocks as a fixed length data forming unit are collected from one frame of picture data stored in the memory 52 corresponding to a predetermined rule. With the process for collecting five macro blocks corresponding to the predetermined rule, picture data is shuffled.

The five macro blocks are referred to as a buffering unit (BU). As described above, by shuffling five macro blocks, information amount of each buffering unit is equalized (averaged). Thus, the distortion due to data compression can be equalized on the screen.

In the 525/60 system, the shuffling process is performed in the following manner.

Figure 5:
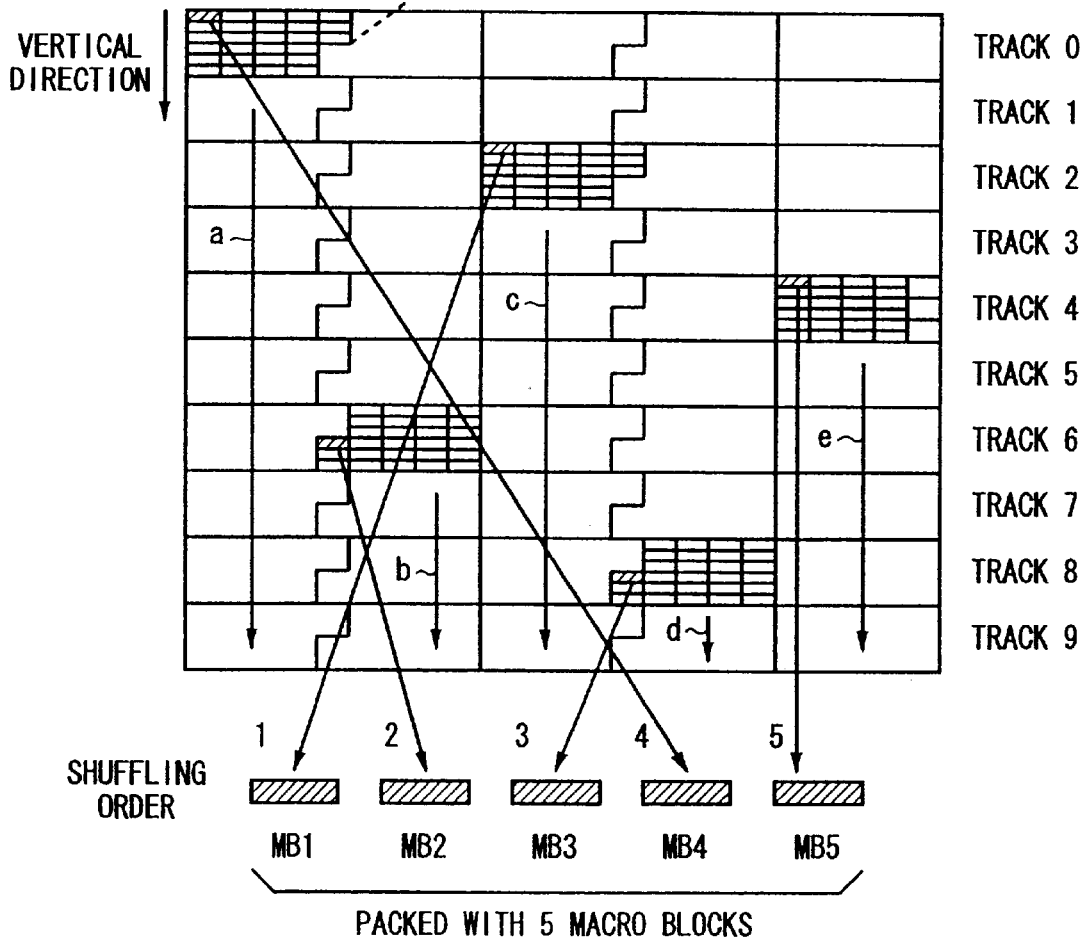
FIG. 5 is a schematic diagram showing a sequence of a shuffling process.

As shown in FIG. 5, one screen is horizontally divided into five portions corresponding to the number of macro blocks in a video segment (that will be described later). In addition, the screen is vertically divided (into ten portions) corresponding to the number of tracks of the magnetic tape on which one frame of data is recorded. One block divided in such a manner is referred to as a super bock. Each super block is composed of 27 macro blocks.

Super blocks are selected from individual vertical rows. First of all, macro blocks (No. 0) contained in individual super blocks are collected and thereby a first video segment (MB1 to MB5) are structured. Next, macro blocks (No. 1) are collected from the same super blocks and thereby a second video segment is structured. The same process is repeated. After all macro blocks are collected from the five super blocks, the next five super blocks are processed. In other words, the next super blocks are selected in the order of arrows a to e shown in FIG. 5.

Video segments that have been block segmented and shuffled by the block segmenting/shuffling portion 51 shown in FIG. 5 are supplied to the DCT/IDCT calculating portion 53. The DCT/IDCT calculating portion 53 performs a DCT calculating process and a variable length code encoding process for the input video segments. The quantizing/dequantizing portion 54 selects a quantizing step with a maximum number of bits in the range that the number of bits (encoded amount) of data that has been variable-length-code encoded does not exceed the number of bits (number of target bits) of the video segments and quantizes the video segments with the selected quantizing step. The quantizing/dequantizing portion 54 zig-zag scans coefficients of individual quantized blocks starting from DC component corresponding to modified two-dimensional Huffman encoding process and assigns code as a set of run length with coefficient "0" and a non-zero coefficient.

Output data of the quantizing/dequantizing portion 54 is supplied to the fixed length data forming portion 55. The fixed length data forming portion 55 packs data of individual video segments as five sync blocks (SB) (that will be described later).

Figure 6:
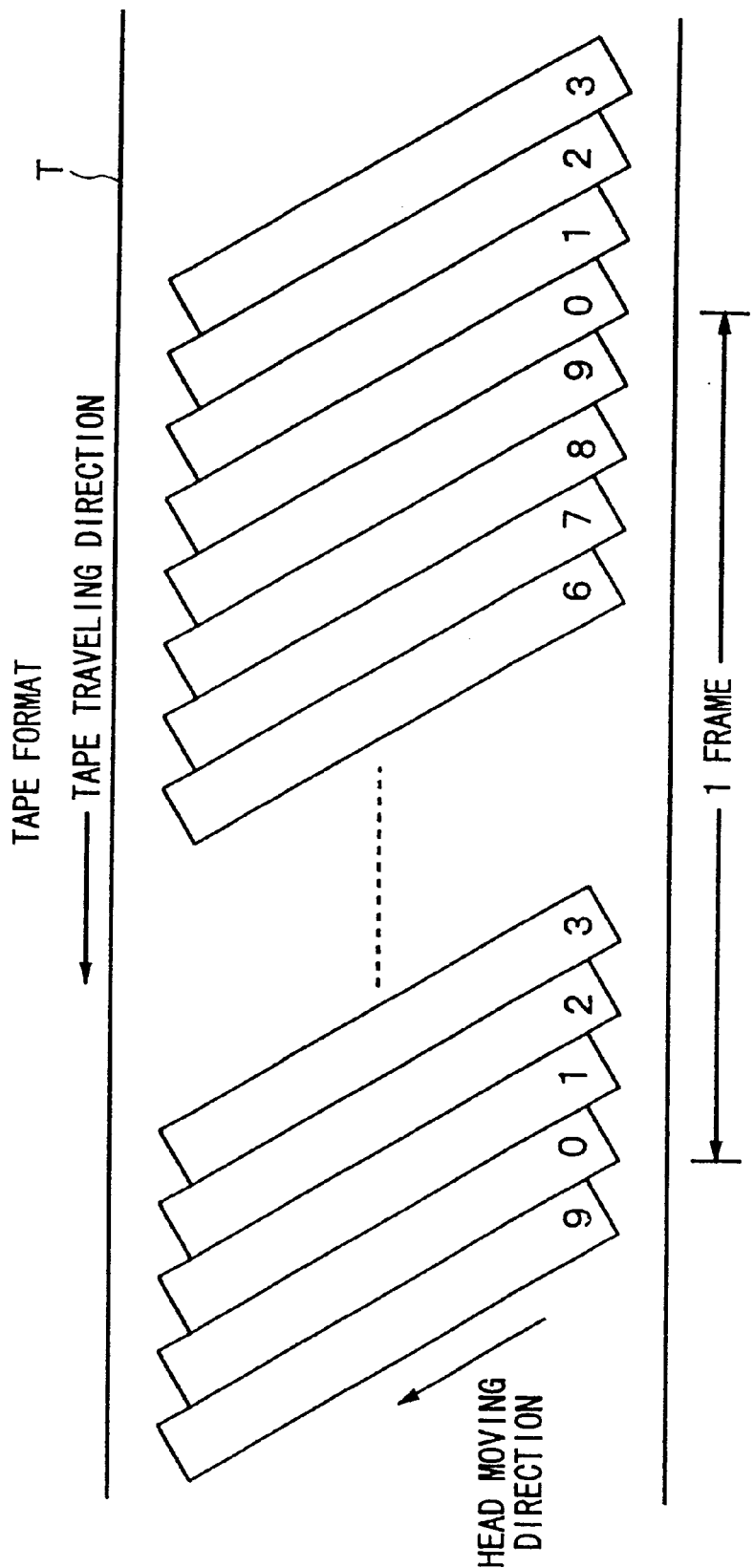
FIG. 6 is a schematic diagram showing a format of a magnetic tape.

Sync blocks are separated small areas on tracks of the magnetic tape. In other words, a video data record area on each track of the magnetic tape is divided into small areas referred to as sync blocks. The number of sync blocks on one block is 135. As described above, in the 525/60 system, as shown in FIG. 6, one frame of video data is divided into 10 portions (tracks 0 to 9) and recorded thereon. Thus, the number of sync blocks per frame is 1350 that is equal to the number of macro blocks per frame.

Figure 7:
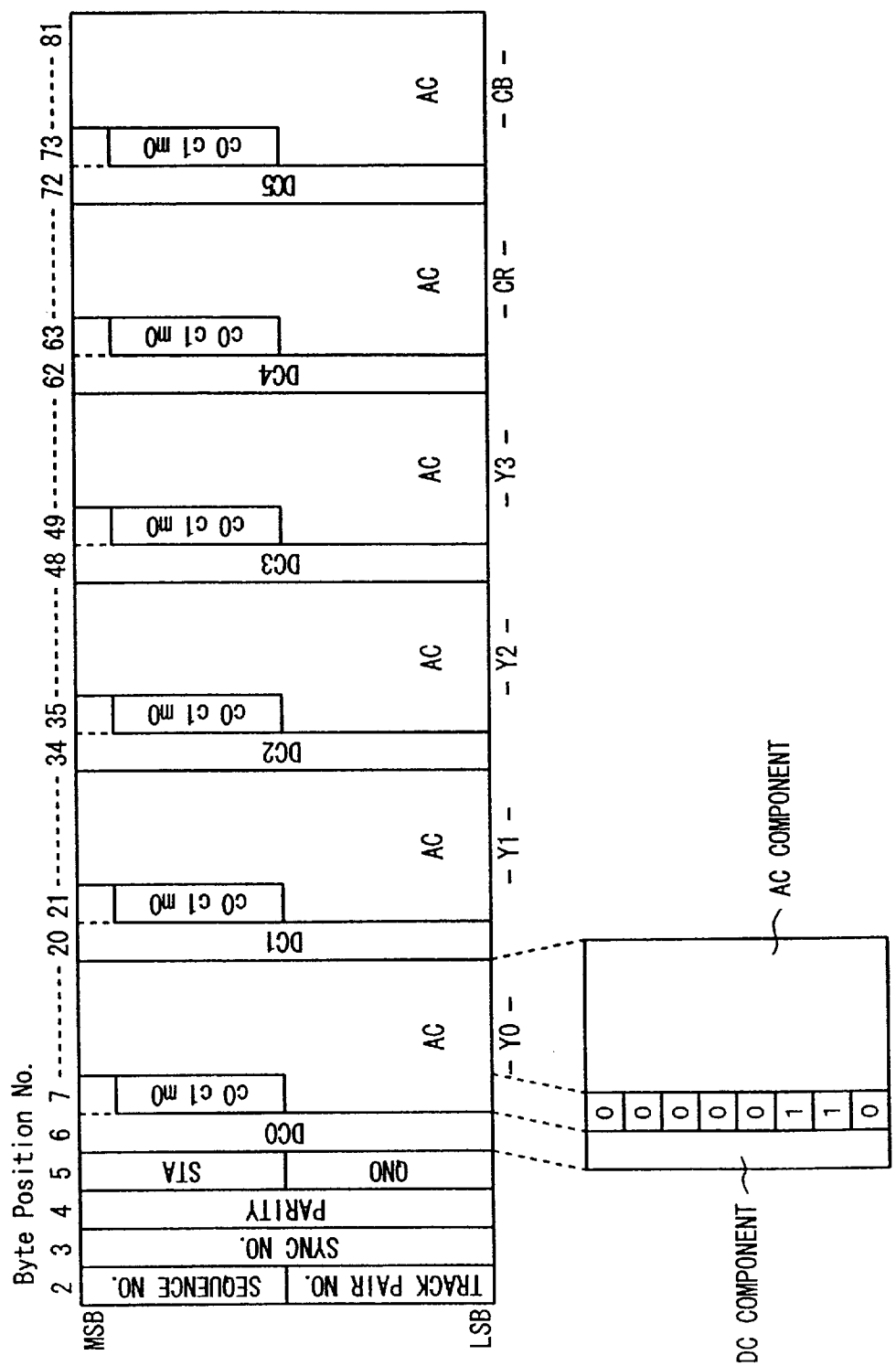
FIG. 7 is a schematic diagram showing the structure of a sync block.

FIG. 7 shows the structure of principal portions of a sync block. The length of each sync block is 90 bytes. Sync pattern data is placed at bytes 0 and 1 (not shown). Likewise, an error correction parity is placed at bytes 82 to 89 (not shown). A track pair number is placed at low order four bits (including LSB (Least Significant Bit)) of byte 2. As shown in FIG. 8, track numbers (0 to 9) are represented as four-bit binary numbers. A sequence number is placed at high order four bits (MSB (Most Significant Bit) of byte 2.

A sync number that represents the position in 135 sync blocks of one track is placed at byte 3. As shown in FIG. 9, the sync number is represented as an eight-bit binary number.

A parity is placed at byte 4. A quantizing table number (QNO) that represents information of a quantizing step is placed at low-order four bits of byte 5. Information (STA) that represents whether or not the macro block has an error is placed at high-order four bits of byte 5. The quantizing table number is used to perform the dequantizing process.

Data of luminance blocks Y0 to Y3 composing the macro block is placed at bytes 6 to 19, bytes 20 to 33, bytes 34 to 47, and bytes 48 to 61, respectively. Data of color difference blocks CR and CB that compose the macro block is placed at bytes 62 to 71 and bytes 72 to 81, respectively. When data of a particular block is not placed in the predetermined area, the data is placed in a blank area of another block of the same sync block. When data of a particular macro block is not placed in an area at bytes 6 to 81, the data is placed in a blank area of another sync block of the five sync blocks.

As shown in FIG. 7, the luminance blocks Y0 and Y3 or the color difference blocks CR and CB that compose the macro block contain a DC component of data and an AC component of data. The DC component of data is placed at the first byte (eight bits) of each block and the MSB (one bit) of the second byte. Thus, the DC component is composed of nine bits. Flags c0, c1, and m0 are placed at Bits 5 to 7 of byte 2, respectively. AC components are placed in other areas. "0110" that represents EOB (End of Block) is placed at the end of each AC component. An enlarged macro block shown in FIG. 7 does not contain an AC component. In this case, "0110" that represents EOB is placed at bits 1 to 4 of the second byte.

Output data of the fixed length data forming portion 55 is supplied to the packet forming portion 61. In addition, the output data of the fixed length data forming portion 55 is supplied to the shuffling/deshuffling portion 56. The packet forming portion 61 performs a packet forming process for compressed video data (at bytes 2 to 81 of each sync block) and supplies the resultant packet data to the driver 62. The driver 62 converts the packet data into serial data corresponding to the format of the IEEE 1394 standard and outputs the resultant serial data through the connector 63.

The shuffling/deshuffling portion 56 writes data of each video segment of which five sync blocks have been packed (namely, shuffled data) to the memory 57 in the order shown in FIG. 5 so as to obtain the original picture data. The shuffling/deshuffling portion 56 reads sync block data of each frame from the memory 57 so that the sync block data is recorded in the order of track 0 to track 9 of the magnetic tape and supplies the resultant data to the ECC portion 58.

The ECC portion 58 adds an error correction parity to the data received from the shuffling/deshuffling portion 56 and supplies the resultant data to the modulating portion 59. The modulating portion 59 performs a digital modulating process for the sync block data received from the ECC portion 59 and supplies the resultant data to the recording/reproducing (playback) amplifier portion (R/P AMP) 60. The recording/reproducing amplifier portion 60 amplifies the signal received from the modulating portion 59 with a predetermined amplitude, supplies the resultant signal to a rotting magnetic head (not shown), and records the signal on the magnetic tape.

Thus, a process for recording a picture signal received from a CCD to a magnetic tape and a process for outputting a picture signal from the connector 63 have been completed. Next, a process for displaying data that is received from the connector 63 or data recorded on a magnetic tape on the LCD 65 will be described in brief.

A picture signal reproduced by the rotating magnetic head is amplified by the recording/reproducing amplifier portion 60 at the predetermined amplitude. The resultant signal is supplied to the modulating portion 59. The modulating portion 59 performs a digital demodulating process for the amplified signal. The resultant data is supplied to the ECC portion 58. The ECC portion 58 performs an error correcting process for the demodulated data corresponding to the parity. The resultant signal is supplied to the shuffling/deshuffling portion 56. The shuffling/deshuffling portion 56 performs a shuffling process for the error-corrected data (see FIG. 5) and supplies the resultant data to the fixed length data forming portion 55.

On the other hand, serial data that is received from an external unit through the connector 63 is supplied to the driver 62. The driver 62 converts the serial data into parallel data. The parallel data is supplied to the packet forming portion 61. The packet forming portion 61 depacks the parallel data (that has been packed) and outputs the resultant data.

The output data of the shuffling/deshuffling portion 56 or the output data of the packet forming portion 61 is supplied to the fixed length data forming portion 55. The fixed length data forming portion 55 performs a depacking process for the data that has been packed and supplies the resultant data to the quantizing/dequantizing portion 54. The quantizing/dequantizing portion 54 performs a variable-length-code dequantizing process and a dequantizing process for the depacked data and supplies the resultant data to a DCT/IDCT calculating portion 53.

The DCT/IDCT calculating portion 53 performs an IDCT calculation for the data received from the quantizing/dequantizing portion 54 and supplies the resultant data to the block segmenting/shuffling portion 51. The block segmenting/shuffling portion 51 performs a deshuffling process and a block desegmenting process for the data received from the DCT/IDCT calculating portion 53 and outputs the resultant data to the D/A converter 64. The D/A converter 64 converts the received digital data to the original analog signal and supplies the resultant signal as a video signal to the LCD 65. The LCD 65 displays the video signal as a picture.

Next, with reference to FIGS. 10 and 11, an example of the structure of the PHS 11 (11-1 to 11-3) shown in FIG. 1 will be described in detail. The PHS 11 is composed of a PHS sending/receiving portion 100 shown in FIG. 10 and a DVCR-PHS interface portion 110 shown in FIG. 11.

Figure 10:
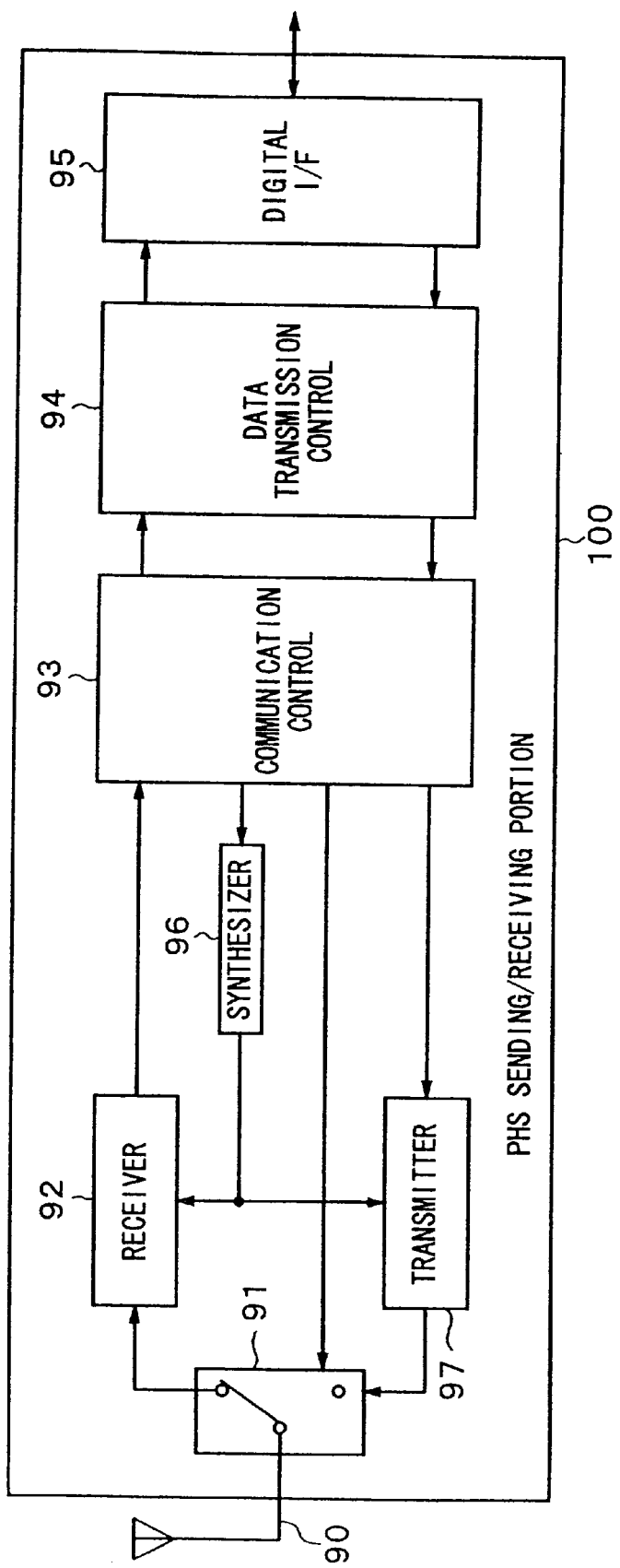
FIG. 10 is a block diagram showing an example of the structure of a PHS sending/receiving portion 100 of a PHS shown in FIG. 1.

The PHS sending/receiving portion 100 shown in FIG. 10 is composed of an antenna 90, a switch 91, a receiving portion 92 (receiving means or receiving step), a communication controlling portion 93, a data transmission controlling portion 94, a digital interface (I/F) portion 95, a synthesizer 96, and a sending portion (sending means, sending step, first sending means, first sending step, second sending means, or second sending step).

The antenna 90 sends a radio wave to the base station 12-1 (or the parent station 17 or 19). In addition, the antenna 90 receives a radio wave from the base station 12-2. A switch position of the switch 91 is changed by the communication controlling portion 93 depending on whether or not a radio wave is sent or received. The receiving portion 92 converts the radio wave received through the switch 91 into an electric signal and supplies the electric signal to the communication controlling portion 93. The communication controlling portion 93 extracts a frame from the signal received from the receiving portion 92 and supplies the frame to the data transmission controlling portion 94. The data transmission controlling portion 94 checks an error of the signal received from the communication controlling portion 93. When the signal does not have an error, the data transmission controlling portion 94 supplies the signal received from the communication controlling portion 93 to the DVCR-PHS interface portion 110 (see FIG. 11) through the digital interface portion 95. In contrast, when the signal received from the communication controlling portion 93 has an error, the data transmission controlling portion 94 requests the sender side to re-send the signal and receives the signal therefrom.

Figure 12:
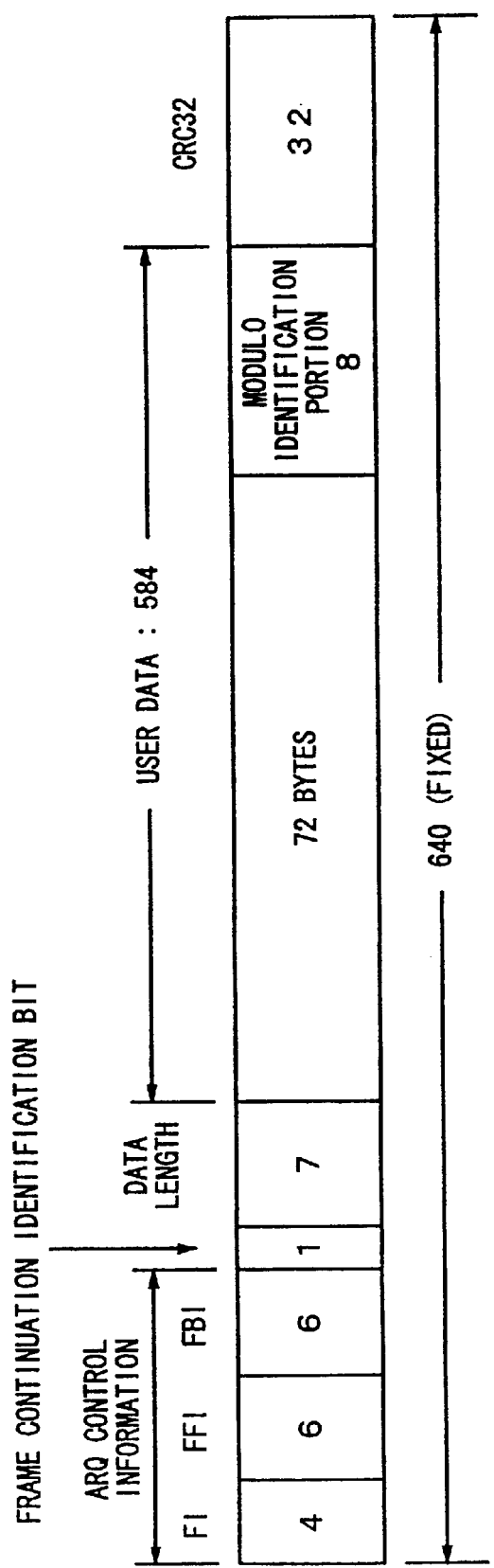
FIG. 12 is a schematic diagram showing an example of the format of data supplied from a digital interface portion 95 shown in FIGS. 10 and 16.

FIG. 12 is a schematic diagram showing an example of the format of data that is output from the digital interface portion 95. In this example, the structure of data corresponding to PIAF (PHS Internet Access Forum Standard) format is shown.

In the PIAF format, one frame has a fixed length of 640 bits. Bits 1 to 4 represent a frame identification number (FI). The next six bits represent a frame number (FFI). The next six bits represent a request frame number (FBI). These three types of information are referred to as ARQ (Automatic Request for Repeat) control information.

The next one bit is a frame continuation identification bit that is used to determine whether or not the current frame is continued from the previous frame. The next seven bits represent the number of bytes of meaningful bits stored in the user data area.

The next 584 bytes represent user data. Eight bytes of the user data represent a modulo identifier that is used to manage the modulo of the frame. The last 32 bytes (CRC 32) are used to detect an error of the frame.

Referring to FIG. 10, an output signal of the DVCR-PHS interface portion 110 is supplied to the digital interface portion 95. The digital interface portion 95 converts the signal received from the digital I/F portion 95 into an analog signal. The analog signal is supplied to the data transmission controlling portion 94. The data transmission controlling portion 94 converts the analog signal received from the digital interface portion 95 into a signal corresponding to a PHS communication protocol. The resultant signal is supplied to the communication controlling portion 93. The communication controlling portion 93 converts the signal received from the data transmission controlling portion 94 into a signal corresponding to the PHS format and supplies the resultant signal to the sending portion 97.

The sending portion 97 modulates a carrier of 1.9 GHz received from the synthesizer 96 corresponding to the signal received from the communication controlling portion 93 and outputs the resultant signal as a radio wave from the antenna 90 through the switch 91.

Figure 11:
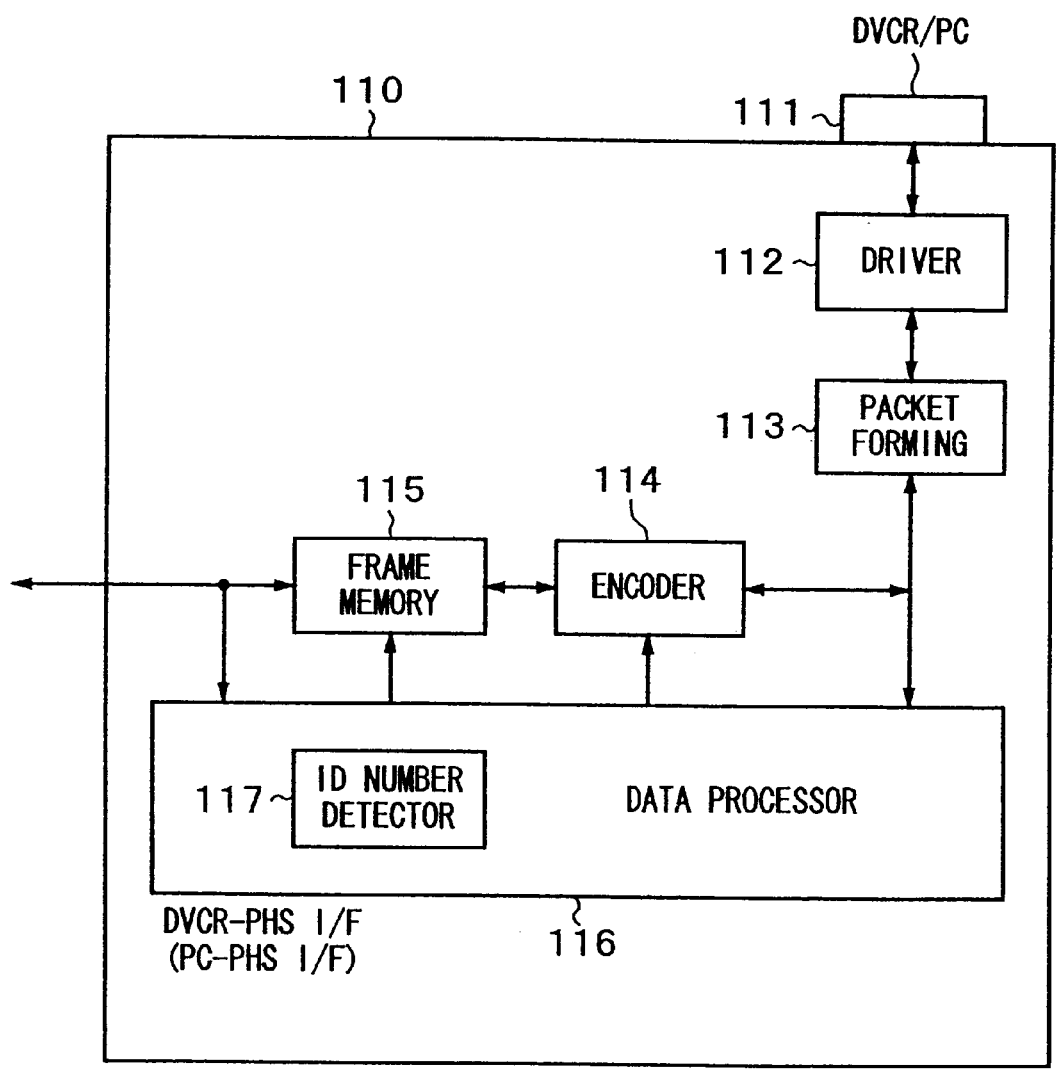
FIG. 11 is a block diagram showing an example of the structure of a DVCR-PHS interface portion of the PHS shown in FIG. 1.

FIG. 11 is a block diagram showing an example of the structure of the DVCR-PHS interface portion 110 that connects the PHS 11-1 and the DVCR 10 (PHS 11-2 or 11-3 and the personal computer 15-2 or 15-3).

The DVCR-PHS interface portion 110 is composed of a connector 111, a driver 112 (outputting means or outputting step), a packet forming portion 113, an encoding portion 114 (reading means, reading step, adding means, adding step, extracting means, extracting step, separating and extracting means, or separating and extracting step), a frame memory 115 (storing means or storing step), a data processing portion 116, and an ID number detecting portion 117 that is disposed in the data processing portion 116.

The connector 111 is a connector corresponding to the IEEE 1394 standard. The connector 111 is connected to the DVCR 10 with a cable. The driver 112 converts serial data received from the connector 111 into parallel data. In addition, the driver 112 converts parallel data received from the packet forming portion 113 into serial data. The packet forming portion 113 depacks the parallel data received from the driver 112. In addition, the packet forming portion 113 packs the parallel data received from the encoding portion 114 as packet data and supplies the packet data to the driver 112. The packet forming portion 113 detects a frame pulse signal from the data received from the driver 112 and supplies the frame pulse signal to the encoding portion 114.

The encoding portion 114 writes one frame of data to the frame memory 115 corresponding to the frame pulse signal received from the packet forming portion 113 and executes a header encoding process for sending information associated with picture data. The encoding portion 114 reads one frame of data that has been received from the PHS 11-1 and written to the frame memory 115 at intervals of 1/30 seconds that are frame intervals and supplies the data as video data to the packet forming portion 113.

The data processing portion 116 controls the packet forming portion 113, the encoding portion 114, and the frame memory 115. The ID number detecting portion 117 of the data processing portion 116 detects an ID number from the data received from the PHS 11-1 and supplies the ID number to the encoding portion 114.

Next, with reference to FIGS. 10 and 11, the process for sending picture data from the DVCR 10 through the PHS 11-1 will be described.

Video data received from the DVCR 10 shown in FIG. 2 is sent to the DVCR-PHS interface portion 110 through the connector 111. The driver 112 converts the received video data into parallel data and supplies the resultant data to the packet forming portion 113. The packet forming portion 113 depacks packet video data and supplies the resultant data to the encoding portion 114. The encoding portion 114 performs a header encoding process for information associated with the video data and successively writes video data to a predetermined area of the frame memory 115.

The data processing portion 116 successively reads only DC components from one frame of picture data stored in the frame memory 115 corresponding to the transmission rate of the PHS 11-1 and outputs the DC components. Thereafter, the data processing portion 116 reads AC components from one frame of picture data stored in the frame memory 115 and outputs the AC components.

Output data of the DVCR-PHS interface portion 110 is supplied to the digital interface portion 95 of the PHS 11 shown in FIG. 10. The digital interface portion 95 converts the received digital data into an analog signal and supplies the analog signal to the data transmission controlling portion 94. The data transmission controlling portion 94 converts the analog signal received from the digital interface portion 95 into a signal corresponding to the PHS communication protocol. The communication controlling portion 93 converts the signal received from the data transmission controlling portion 94 into a signal corresponding to the PHS format and supplies the resultant signal to the sending portion 97.

The sending portion 97 modulates a carrier of 1.9 GHz received from the synthesizer 96 corresponding to the signal received from the communication controlling portion 93 and outputs the resultant signal as a radio wave from the antenna 90 through the switch 91.

The radio wave is received by the base station 12-1 (or parent unit 17 or 19). After the radio wave is processed by the base station 12-1, the resultant signal is sent to a predetermined terminal through the ISDN line 13.

Next, the process for receiving data through the ISDN line 13 and displaying the received data on the display unit will be described. The routes 2 and 3 of which data received through the ISDN line 13 is converted into a radio wave will be described.

On the route 2, picture data received through the ISDN line 13 is supplied to the DSU of the parent unit 17. The DSU converts the received picture data into predetermined data, converts the resultant data into a radio wave corresponding to the PHS format, and sends the radio wave.

Since the structure of the PHS 11-2 is the same as the structure of the PHS 11-1 shown in FIGS. 10 and 11, with reference to FIGS. 10 and 11, the operation of the PHS 11-2 will be described.

A radio wave received by the antenna 90 shown in FIG. 10 is supplied to the switch 91. The switch position of the switch 91 is changed by the communication controlling portion 93. At this point, the switch 91 is connected to the position of the receiving portion 92. Thus, the radio wave received from the switch 91 is supplied to the receiving portion 92. The receiving portion 92 converts the received radio wave into an electric signal corresponding thereto and supplies the electric signal to the communication controlling portion 93. The communication controlling portion 93 extracts a frame from the electric signal received from the receiving portion 92 and supplies the frame to the data transmission controlling portion 94. The data transmission controlling portion 94 checks an error of the signal received from the communication controlling portion 93. When the signal does not have an error, the data transmission controlling portion 94 sends the signal to the DVCR-PHS interface portion 110 (see FIG. 11) through the digital interface portion 95.

When the signal has an error, the data transmission controlling portion 94 requests the sender side to re-send the signal and receives the signal therefrom.

Data that is sent to the DVCR-PHS interface portion 110 shown in FIG. 11 is successively stored in the frame memory 115. As described above, the picture data is sent in the order of DC components and AC components. Thus, the data is stored in the frame memory in such an order. At this point, as shown in FIG. 7, the DC components are DC0 to DC5 at first byte of the individual macro blocks (Y0 to Y3 or CR and CB). Thus, the amount of information of one frame is around 864 kbits. The DC components are stored in the same order as macro blocks of the shuffling process shown in FIG. 5. In other words, macro block data is stored in the frame memory 115 in the same order as the reading process thereof.

When the data processing portion 116 receives a sync block, it outputs the frame pulse signal to the ID number detecting portion 117. When the ID number detecting portion 117 receives the frame pulse signal, the ID number detecting portion 117 detects an ID (track pair number and sync number (see FIG. 7)) from the data received from the PHS 11 and supplies the detected ID to the encoding portion 114.

The encoding portion 114 reads data stored in the frame memory 115 at intervals of 1/30 seconds that are frame intervals of the video signal and sends the read data as video data to the packet forming portion 113.

Data received from the digital interface portion 95 of the PHS sending/receiving portion 100 is successively stored in the frame memory 115 at 32 kbits/s that is the information transmission rate of the ISDN line. On the other hand, since the encoding portion 114 reads one frame of data at intervals of 1/30 seconds, before all data is stored in the frame memory 115, the data is read as video data.

With reference to the ID (of a sync block stored in the frame memory 115) received from the ID number detecting portion 117, the encoding portion 114 reads a buffering unit (composed of five sync blocks) of picture data and outputs the buffering unit as it is. When the picture data is a fragment of a buffering unit (namely, the entire sync block has not been stored), the encoding portion 114 outputs a gray code of which all DC components are "0" and "0110" that represents EOB is placed at bits 1 (LSB) to bit 4 of the second byte. FIG. 13A shows a gray code corresponding to the luminance blocks Y0 to Y3. FIG. 13B shows a gray code corresponding to the color difference blocks CR and CB.

When a new frame data is received, the encoding portion 114 erases the ID of the former frame. Thus, the aforementioned process is repeated frame by frame.

Video data received from the encoding portion 114 is supplied to the packet forming portion 113. The packet forming portion 113 packs the video data as packet data with a predetermined length and supplies the packet data to the driver 112. The driver 112 converts the packet data into serial data corresponding to the IEEE 1394 standard and outputs the serial data through the connector 111.

The video data is supplied to the personal computer 15-2 shown in FIG. 1. The personal computer 15-2 converts the data received from the DVCR-PHS interface portion 110 into the original picture data with the DVCR decoding IC or the software and displays the resultant data on the display unit.

In this case, video data that is supplied to the personal computer 15-2 is displayed in the following process.

When the PHS sending/receiving portion 100 shown in FIG. 10 starts receiving a new frame of picture data, the encoding portion 114 of the DVCR-PHS interface portion 110 shown in FIG. 11 erases the ID of the previous frame. Thus, video data composed of gray data shown in FIG. 13 is output. Consequently, the entire screen of the display unit of the personal computer becomes gray.

When the PHS sending/receiving portion 100 starts receiving DC components, they are stored in the frame memory 115. The video data that is output from the DVCR-PHS interface portion 110 is composed of DC components of an area that has been completely received and gray data of an area that has not been completely received. Thus, as DC components are received, a picture of the DC components is gradually displayed on the gray screen. It takes around one second to receive the DC components. Around one second after frame data is received, the picture of the DC components is displayed.

Figure 14:
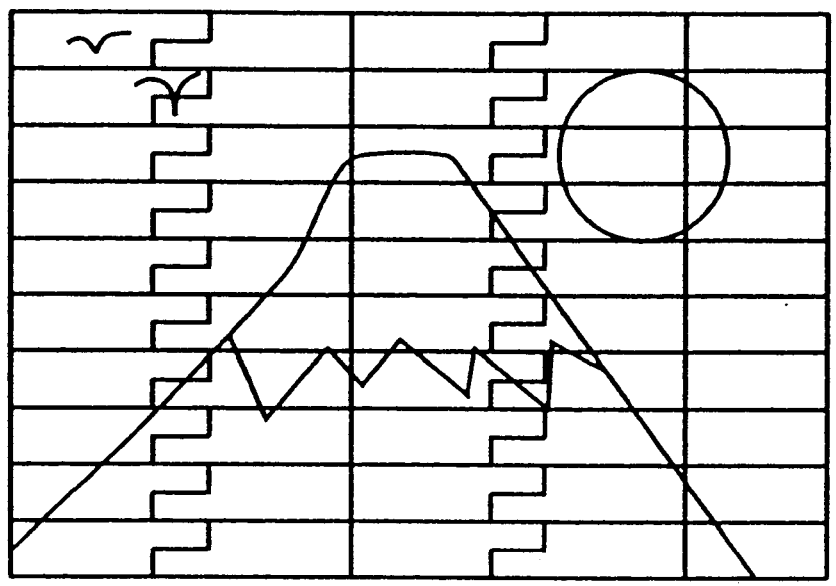
FIG. 14 is a schematic diagram showing an example of video data displayed according to the embodiment shown in FIGS. 10 and 11.

FIG. 14 is a schematic diagram showing picture data composed of only DC components displayed. With the DC components being displayed, a rough contour of the picture can be recognized.

Thereafter, the PHS sending/receiving portion 100 receives AC components of the picture data. When the AC components are received and supplied to the DVCR-PHS interface portion 100, the picture of the area that has been completely received becomes the same as the original picture (stored on the sender side). Thus, as the AC components are received, the original picture is gradually displayed. It takes around 12.5 seconds to receive the complete AC components.

Figure 15:
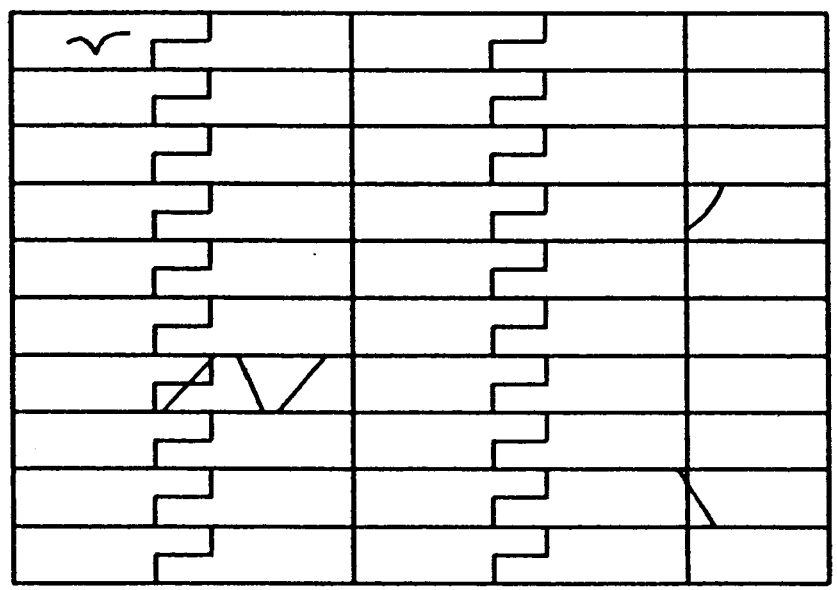
FIG. 15 is a schematic diagram showing an example of a picture displayed according to a conventional receiving apparatus.

FIG. 15 shows an example of an original picture (shown in FIG. 14) displayed in the conventional method (of which both the DC component and the AC component are displayed at the same time). In this case, since the original picture (composed of DC components and AC components) is received and reproduced as super blocks, the picture is partially displayed as shown in FIG. 15. It takes around 13.5 seconds to display one frame of picture. In other words, according to the conventional method, it takes a longer time for the user to recognize a picture that is displayed.

As described above, according to the present invention, with the DC components received from the sender side, a rough contour of the picture can be recognized. Thus, the user can recognize the received picture in a relatively short time. In addition, since the encoding portion 114 processes a buffering unit of data stored in the frame memory 115 at a time, when the obtained video data is supplied to the DVCR 10 or the like, the picture can be decoded free from an error.

The personal computer 15-1 includes the DVCR-PHS interface portion 110 shown in FIG. 11, the DVCR encoding IC, and the DVCR decoding IC. The data received from the DSU 14 is supplied to the DVCR-PHS interface portion 110. The DVCR-PHS interface portion 110 converts the data received from the DSU 14 into video data. The DVCR decoding IC converts the data received from the DSU 14 into a picture signal. The picture signal is displayed on the display unit and also recorded on a hard disk or the like (not shown). In addition, a picture signal recorded on a hard disk or the like (not shown) is sent to the DVCR encoding IC. The DVCR encoding IC encodes the picture signal. The resultant signal is sent to the DVCR-PHS interface portion 110. The DVCR-PHS interface portion 110 converts the encoded signal into predetermined data.

Each of the personal computers 16-1 and 16-2 includes the PHS sending/receiving portion 100 shown in FIG. 10, the DVCR-PHS interface portion 110 shown in FIG. 11, the DVCR encoding IC, and the DVCR decoding IC. Each of the personal computers 16-1 and 16-2 receives a radio wave from the parent unit 17 or 19, reproduces the picture in the same operation as the personal computer 15-1, converts a picture signal recorded on a hard disk or the like (not shown) into a radio wave, and sends the radio wave.

In the above-described embodiment, the picture signal is sent in the order of DC components and AC components. However, only DC components of the picture signal may be sent. Next, such a case will be described with reference to the embodiment shown in FIGS. 10 and 11.

Video data that is received from the DVCR 10 (or personal computer 15-2 or 15-3) through the connector 111 is supplied to the driver 112. The driver 112 converts the video data into parallel data and supplies the parallel data to the packet forming portion 113. The packet forming portion 113 depacks the packet video data and supplies the resultant data to the encoding portion 114.

The encoding portion 114 stores data "0110" that represents EOB at bits 1 to 4 of the second byte (the first four bits of the area that stores an AC component) of a macro block contained in a sync block that composes video data received from the packet forming portion 113. Thus, the data "0110" represents that the macro block contains only a DC component. DC components of the picture signal received from the encoding portion 114 are successively stored in the frame memory 115. The DC components stored in the frame memory 115 are read in the order as shown in FIG. 5 and sent to the PHS sending/receiving portion 100. The PHS sending/receiving portion 100 modulates a carrier corresponding to the received data and sends the modulated carrier as a radio wave from the antenna 90.

The radio wave sent from the PHS sending/receiving portion 100 is received by the base station 12-1 or 12-2 or the parent unit 17. The base station 12-1 or 12-2 or the parent unit 17 converts the radio wave into an electric signal and sends the electric signal to the ISDN line 13. Data sent through the ISDN line 13 is received by a predetermined terminal unit. The predetermined terminal unit decodes the received data into an original picture signal. The original picture signal is displayed on the display unit or the like.

For example, when the personal computer 15-2 is selected as a terminal unit, the data received through the ISDN line 13 is sent to the parent unit 17. The parent unit 17 converts the received data into a radio wave and sends the radio wave. The PHS sending/receiving portion 100 receives the radio wave from the parent unit 17, performs the above-described process for the radio wave, and sends the resultant signal to the DVCR-PHS interface portion 110 shown in FIG. 11. The DVCR-PHS interface portion 110 successively stores the received data in the predetermined area of the frame memory 115. The encoding portion 114 reads the data stored in the frame memory 115 at intervals of 1/30 seconds and outputs the read data as video data through the packet forming portion 113 and the driver portion 112.

Thus, a gray picture composed of gray data is displayed on the display unit of the personal computer 15-2. As DC components are received, a picture as shown in FIG. 14 is gradually displayed.

According to the above-described structure, only DC components can be extracted from the video data (moving picture) received from the DVCR 10 (or the personal computer 15-2 or 15-3) and the extracted DC components can be supplied to the receiver side through the ISDN line 13. Since it takes around one second to send the DC components for one frame, new pictures are displayed every one second on the receiver side. Thus, pictures are displayed as with a semi-moving picture.

In the embodiment, a total of nine bits of the first byte and bit 8 of the second byte of each macro block are sent as DC components. However, only eight bits of the first byte may be sent. Thus, since the amount of information per frame can be reduced, the transmission rate can be increased. In addition, since digital data is mainly processed in a unit of eight bits, a conventional signal processing portion of the receiving apparatus can be used. Consequently, the cost of the apparatus can be reduced. Moreover, the apparatus can be simply designed.

When the number of bits of information of a picture is decreased by one, the amount of information to be sent is decreased. However, the deterioration of the picture quality is small.

Figure 16:
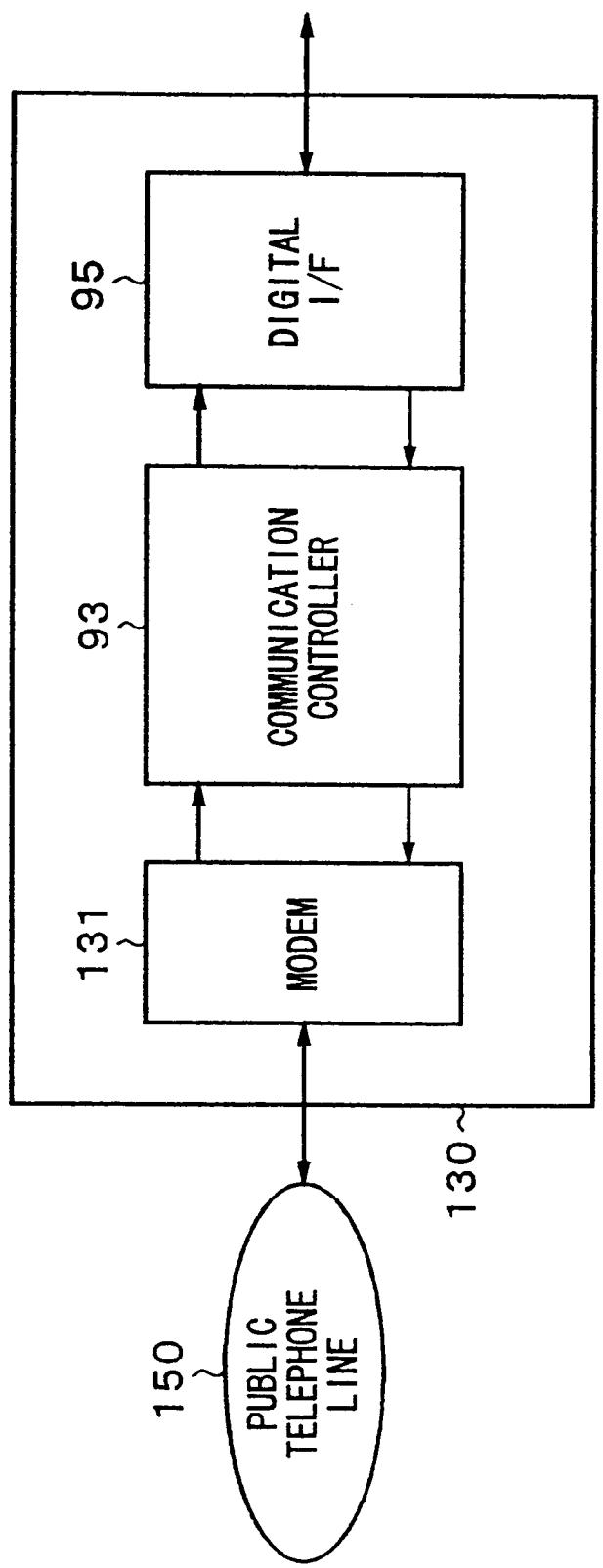
FIG. 16 is a block diagram showing an example of the structure of a public telephone line type sending/receiving apparatus for sending/receiving picture data through a public telephone line.

FIG. 16 is a block diagram showing an example of the structure of a public telephone line type sending/receiving apparatus using a public (analog) telephone line. The public telephone line type sending/receiving apparatus sends and receives picture data.

In FIG. 16, similar portions to those in FIG. 10 are denoted by similar reference numerals and description thereof is omitted. The structure shown in FIG. 16 is the same as the structure shown in FIG. 10 except that the antenna 90, the switch 91, the receiving portion 92, the data transmission controlling portion 94, the synthesizer 96, and the sending portion are removed and that a modem portion 131 is newly added. The modem portion 131 is connected to a public telephone line 150.

The modem portion 131 modulates data received from the communication controlling portion 93 in a signal format corresponding to the public telephone line 150. In addition, the modem portion 131 demodulates data received through the public telephone line 150 and supplies the demodulated data to the communication controlling portion 93.

Next, the sending operation and the receiving operation of the embodiment will be described in brief.

The DVCR-PHS interface portion 110 successively extracts DC components and AC components from each frame of video data received from the DVCR 10 or the personal computer 15-2 or 15-3 and sends the DC components and the AC components to the digital interface portion 95 of the public telephone line type sending/receiving apparatus 130. The digital interface portion 95 converts serial data received from the DVCR-PHS interface portion 110 into parallel data and supplies the parallel data to the communication controlling portion 93. The communication controlling portion 93 converts the data received from the digital interface portion 95 corresponding to the protocol of the public telephone line 150.

The modem portion 131 converts data received from the communication controlling portion 93 into an analog signal corresponding to the public telephone line 150 and sends the resultant signal to the public telephone line 150.

In other words, the video data that is received from the DVCR 10 is sent to the DVCR-PHS interface portion 110. The DVCR-PHS interface portion 110 successively extracts DC components and AC components from each frame and sends the DC components and the AC components to the public telephone line type sending/receiving apparatus 130. The public telephone line type sending/receiving apparatus 130 converts data received from the DVCR-PHS interface portion 110 into an analog signal in the format corresponding to the public telephone line 150 and sends the resultant signal to the public telephone line 150.

Next, the receiving operation of the embodiment will be described.

Data received through the public telephone line 150 is sent to the modem portion 131. The modem portion 131 demodulates the received data into the original digital signal. The communication controlling portion 93 extracts a frame from the data received from the modem portion 131 and supplies the frame to the digital interface portion 95. The digital interface portion 95 converts the parallel data received from the communication controlling portion 93 into serial data and supplies the serial data to the DVCR-PHS interface portion 110.

As described above, the DVCR-PHS interface portion 110 successively writes the received data to the frame memory 115. In addition, the DVCR-PHS interface portion 110 converts data stored in the frame memory 115 into video data, performs a packet forming process for the video data, and supplies the packet data to the DVCR 10 (or the personal computer 15-2 ro 15-3). The DVCR 10 displays the input video signal on the LCD 65. In addition, the DVCR 10 records the received video signal on a magnetic tape.

In the above-described structure, video data that is received from the DVCR 10 or the personal computer 15-2 or 15-3 is extracted in the order of DC components and AC components. The extracted DC components and AC components are sent through the public telephone line 150. In addition, data received through the public telephone line 150 is converted into video data and supplied to the DVCR 10 or the personal computer 15-2 or 15-3. Thus, the video data is displayed as a picture. At this point, since the DC components are sent before the AC components, a rough contour of the received picture can be quickly recognized on the receiver side. Thus, the user can know whether or not the received picture is a desired picture.

In the above-described embodiment, after DC components of the video data are sent, AC components are sent. However, only the DC components may be sent.

In the above-described embodiment, data that is send and received to/from the digital interface portion 95 (see FIGS. 10 and 16) corresponds to the PIAF standard. However, it should be noted that other than the PIAF standard can be used.

Figures 17A, 17B, 17C:
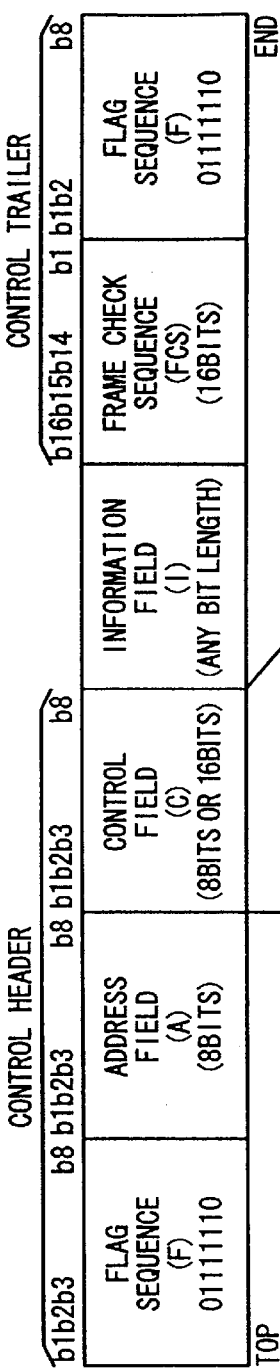
FIGS. 17A, 17B, and 17C are schematic diagrams showing other examples of formats of data that is output from the digital interface portions 95 shown in FIGS. 10 and 16.

FIG. 17 shows an example of another format of data that is received and sent to/from the digital interface portion 95. In FIG. 17, the format corresponding to the HDLC (High-level Data Link Control) is shown. As shown in FIG. 17A, the first eight bits of each frame represent data of a flag sequence. The next eight bits represent an address field. The next eight bits (or 16 bits) represent a control field. These flag sequence, address field, and control field are referred to as a control header. The next information field has any bit length. The information field stores user data.

The next 16 bits represent a frame verification sequence. The next eight bits represent a flag sequence. These frame sequence and flag sequence are referred to as a control trailer.

When the control field is composed of eight bits, the format of the field has a structure as shown in FIG. 17B.

When the control field is composed of 16 bits, the format of the field has a structure as shown in FIG. 17C.

When data is sent in the format corresponding to the HDLC standard, the data can be effectively sent.

In the above-described embodiment, picture data is sent with (through) the ISDN line 13, the public telephone line 150, and radio wave as a transmission medium. However, it should be noted that the transmission medium is not limited to these.

What is claimed is:

1. A picture receiving apparatus for receiving a picture signal sent through a transmission medium, said picture signal having a plurality of DC and AC components, with each DC component associated with a block of said AC components, performing a predetermined process for the picture signal, and outputting the resultant picture signal to a peripheral unit, comprising:

receiving means for receiving the picture signal;

storing means for storing the picture signal received by said receiving means;

reading means for successively reading the picture signal stored in said storing means;

adding means for adding end of block (EOB) information representing the end position of data to each macro block contained in a sync block containing the DC components read by said reading means, wherein an EOB code is added following each DC component; and outputting means for outputting the DC components received from said adding means and thereafter, outputting the AC components received from said reading means to enable faster initial recognition of a picture containing the DC and AC components when displayed on a display means.

2. The picture receiving apparatus as set forth in claim 1, wherein said reading means reads the DC components and the AC components in a buffering unit of a predetermined number of macroblocks.

3. The picture receiving apparatus as set forth in claim 2, wherein when data of the buffering unit read by said reading means has not been stored in said storing means, said outputting means outputs gray data to be displayed on the display means prior to the display of a picture having the DC and AC components.

4. The picture receiving apparatus as set forth in claim 1, wherein the peripheral unit is a DVCR (Digital Video Cassette Recorder), and wherein said outputting means outputs the picture signal to the DVCR.

5. The picture receiving apparatus as set forth in claim 1, wherein the peripheral unit is a personal computer, and wherein said outputting means outputs the picture signal to the personal computer.

6. The picture receiving apparatus as set forth in claim 5, wherein the personal computer includes:

picture compressing/decompressing means for performing a picture compressing/decompressing process.

7. The picture receiving apparatus as set forth in claim 1, wherein said transmission medium is a radio wave corresponding to the format of a PHS (Personal Handyphone System).

8. The picture receiving apparatus as set forth in claim 1, wherein the macro block includes eight-bit data that is the DC component.

9. A picture receiving method for receiving a picture signal sent through a transmission medium, said picture signal having a plurality of DC and AC components, performing a predetermined process for the picture signal, and outputting the resultant picture signal to a peripheral unit, comprising the steps of:

receiving the picture signal;

storing the picture signal received at the receiving step;

successively reading the picture signal stored at the storing step;

adding end of block (EOB) information representing the end position of data to each macro block contained in a sync block containing the DC components read at the reading step, wherein an EOB code is added following each DC component; and outputting the DC components received at the adding step and thereafter, the AC components received at the reading step, to enable faster initial recognition of a picture containing the DC and AC components when displayed on a display means.

10. A picture receiving apparatus for receiving only DC components of a picture signal sent through a transmission medium, performing a predetermined process for the DC components, and outputting the resultant data to a peripheral unit, comprising:

receiving means for receiving the DC components;

storing means for storing the DC components received by said receiving means;

reading means for successively reading the DC components stored in said storing means;

adding means for adding EOB information representing the end position of data to each macro block contained in a sync block containing the DC components read by said reading means; and outputting means for outputting the DC components received from said adding means.

11. A picture receiving method for receiving only DC components of a picture signal sent through a transmission medium, performing a predetermined process for the DC components, and outputting the resultant data to a peripheral unit, comprising the steps of:

receiving the DC components;

storing the DC components received at the received step;

successively reading the DC components stored at the storing step;

adding EOB information representing the end position of data to each macro block contained in a sync block composing the DC containing read at the reading step; and outputting the DC components received at the adding step.

12. A picture sending/receiving apparatus having a sender unit and a receiver unit, the sender unit sending a picture signal through a transmission medium, the receiver unit reproducing a received picture signal, wherein the sender unit comprises:

separating and extracting means for separating and extracting DC components and AC components from the picture signal;

first sending means for sending the DC components extracted by said separating and extracting means through the transmission medium; and second sending means for sending the AC components extracted by said separating and extracting means through the transmission medium, and wherein the receiver unit comprises:

receiving means for receiving DC and AC components of a picture of an entire frame;

storing means for storing the DC and AC components received by said receiving means;

reading means for successively reading the DC components and the ac components stored in said storing means;

adding means for adding end of block (EOB) information representing the end position of data to each macro block contained in a sync block containing the DC components read by said reading means, wherein an EOB code is added following each DC component; and outputting means for outputting all the DC components of the frame received from said adding means and thereafter, outputting all the AC components of the frame received from said reading means, to enable faster initial recognition of the frame picture when subsequently displayed on a display means.

13. A picture sending/receiving method of a sender unit and a receiver unit, the sender unit sending a picture signal through a transmission medium, the receiver unit reproducing a received picture signal, comprising the steps of:

(a) causing the sender unit to separate and extract DC components and AC components from the picture signal;

(b) causing the sender unit to send the DC components extracted at step (a) through the transmission medium;

(c) causing the sender unit send the AC components extracted at step (a) through the transmission medium;

(d) causing the receiver unit to receive DC and AC components of a picture of an entire frame;

(e) causing the receiver unit to store the DC components and the AC components received at step (d);

(f) causing the receiver unit to successively read the DC components and the AC components stored at step (e);

(g) causing the receiver unit to add end of block (EOB) information representing the end position of data to each macro block contained in a sync block containing the DC components read at step (f), wherein an EOB code is added following each DC component; and (h) causing the receiver unit to output the DC components of the frame received at step (g) and thereafter, to output all the AC components of the frame received at step (f), to enable faster initial recognition of the frame picture when subsequently displayed on a display means.

14. A picture signal receiving and displaying method, comprising:

receiving, via a transmission medium, a frame of a picture signal having a plurality of data blocks, with each frame having DC and AC components;

outputting all the DC components of the frame, followed by all the AC components of the frame, to enable faster initial recognition of a picture of the frame displayed on a display device; and wirelessly transmitting the DC components followed by the AC components output in the outputting step to a base station for subsequent transmission to a remote display device comprising a personal computer connected to a personal handyphone system, wherein said personal handyphone system wirelessly receives, through an ISDN network and wireless transmitting device coupled to said base station, said DC components followed by said AC components of said frame, and provides the received components to said personal computer for display of said frame in the order of said DC components followed by said AC components.

* * * * *